United States Patent
Ramaiyer (10) Patent No.: US 8,271,426 B2
(45) Date of Patent: Sep. 18, 2012

(54) CHANGE APPLICATION FOR DATASETS USING FROZEN AND DELTA VALUES

(75) Inventor: Kumar Ramaiyer, Cupertino, CA (US)

(73) Assignee: Oracle International Corporation, Redwood Shores, CA (US)

( * ) Notice: Subject to any disclaimer, the term of this patent is extended or adjusted under 35 U.S.C. 154(b) by 286 days.

(21) Appl. No.: 12/572,048

(22) Filed: Oct. 1, 2009

(65) Prior Publication Data

US 2011/0082830 A1    Apr. 7, 2011

(51) Int. Cl.
*G06F 7/00* (2006.01)
*G06F 17/00* (2006.01)

(52) U.S. Cl. .......... 707/600; 707/603; 707/736; 707/756
(58) Field of Classification Search .................. None
See application file for complete search history.

(56) References Cited

U.S. PATENT DOCUMENTS

| | | | |
|---|---|---|---|
| 7,149,858 B1 * | 12/2006 | Kiselev | 711/162 |
| 7,546,484 B2 * | 6/2009 | Sen et al. | 714/6.3 |
| 2005/0262108 A1 | 11/2005 | Gupta | |
| 2006/0288046 A1 | 12/2006 | Gupta et al. | |
| 2007/0198605 A1 * | 8/2007 | Saika | 707/202 |
| 2007/0220320 A1 * | 9/2007 | Sen et al. | 714/13 |

OTHER PUBLICATIONS

Exploiting Versions for On-line Data Warehouse Maintenance in MOLAP Servers, by Kang et al., Proceedings of the 28$^{th}$ VLDB Conference, Hong Kong, China, 2002.*

* cited by examiner

*Primary Examiner* — Jay Morrison
(74) *Attorney, Agent, or Firm* — Trellis IP Law Group, PC (57) ABSTRACT

A method includes storing a first value for one or more measures in a block of data for the cube of data. The first value is a value where the state of the cube is that no changes are applicable to the block of data. A second value is stored for the one or more measures in the block of data. The second value is a delta value representing changes made to the block of data based on the first value. A change is received to the block. A computer processor then calculates a new second value based on the change to the block. The new second value is stored in place of the second value previously stored while the first value remains the same. The second value represents the cumulative changes to the measure since the frozen value was determined.

20 Claims, 8 Drawing Sheets

CHANGE APPLICATION FOR DATASETS USING FROZEN AND DELTA VALUES

BACKGROUND

Particular embodiments generally relate to management and analysis of datasets.

Online analytical processing (OLAP) applications are used to provide answers to analytical queries that are multi-dimensional in nature. Because multi-dimensional data may organize data in more than two dimensions, a multi-dimensional data model is used to store the data in a database. A cube has been developed as a model to store multi-dimensional objects where the cube is stored as multiple blocks of data.

Multiple changes to the stored data may occur. When a change is made, a log entry is generated for the change and appended to an end of a change list. The change list summarizes all the changes that have been made, but have not been applied to the dataset. When a block is retrieved, the database system checks if any pending changes should be applied. All the change entries in the change log are then applied one-by-one and in order. However, changes to a measure in one block may also affect changes for other measures. Thus, each change to a measure may result in multiple other derived changes. Many user changes may be made to a block over time, such as a user may be trying out many different values for a measure in a block. This may result in an explosion of changes that need to be applied because of the derived entries that need to be calculated for each change.

SUMMARY

Particular embodiments generally relate to storing a multi-dimensional block of data for a cube of data. The cube of data includes a plurality of blocks of data for different combinations of dimensions for the cube of data. A method includes storing a first value for one or more measures in a block of data for the cube of data. The first value is a value where the state of the block is that no changes are applicable to the block of data. A second value is stored for the one or more measures in the block of data. The second value is a delta value representing changes made to the block of data based on the first value. A change is received to the block. A computer processor then calculates a new second value based on the change to the block. The new second value is stored in place of the second value previously stored while the first value remains the same. The second value represents the cumulative changes to the measure since the frozen value was determined.

In one embodiment, a method for storing multi-dimensional block data for a cube of data is provided. The cube of data includes a plurality of blocks of data for different combinations for dimensions of the cube of data. The method comprises: storing a first value for a measure in a block of data for the cube of data, the first value being a value at a freeze time in which all applicable changes have been made to the block of data; storing a second value for the measure in the block of data for the cube of data, wherein the second value collapses changes made to the measure since the freeze time in the second value; receiving a change to the block; calculating, by a computer processor, a new second value based on the change to the block; and storing the new second value in place of the second value previously stored for the measure, wherein the new second value collapses changes made to the measure since the freeze time in the new second value.

In another embodiment, a computer-readable storage medium comprising encoded logic for execution by the one or more computer processors is provided. The logic when executed instructs the one or more computer processors to perform: storing a first value for a measure in a block of data for the cube of data, the first value being a value at a freeze time in which all applicable changes have been made to the block of data; storing a second value for the measure in the block of data for the cube of data, wherein the second value collapses changes made to the measure since the freeze time in the second value; receiving a change to the block; calculating, by a computer processor, a new second value based on the change to the block; and storing the new second value in place of the second value previously stored for the measure, wherein the new second value collapses changes made to the measure since the freeze time in the new second value.

In yet another embodiment, an apparatus comprising: one or more computer processors; and logic encoded in one or more computer readable storage media for execution by the one or more processors is provided. The logic when executed instructs the one or more computer processors to perform: storing a first value for a measure in a block of data for the cube of data, the first value being a value at a freeze time in which all applicable changes have been made to the block of data; storing a second value for the measure in the block of data for the cube of data, wherein the second value collapses changes made to the measure since the freeze time in the second value; receiving a change to the block; calculating, by a computer processor, a new second value based on the change to the block; and storing the new second value in place of the second value previously stored for the measure, wherein the new second value collapses changes made to the measure since the freeze time in the new second value.

A further understanding of the nature and the advantages of particular embodiments disclosed herein may be realized by reference of the remaining portions of the specification and the attached drawings.

DETAILED DESCRIPTION OF EMBODIMENTS

Particular embodiments store two values per measure for a block of data. A first value stored is a frozen value. This represents the value for each measure when all changes have been applied to the blocks of a cube of data. This time may be referred to as the freeze time. A second value is a delta value for the measure in the block. The delta value reflects the changes made to the measure. When a change is made to a measure, the difference between the new value and the frozen value is determined and stored as the delta value. As multiple changes are made, the changes are cumulated in the delta value. The frozen value remains the same as the changes are applied. However, the delta value keeps changing and represents all the changes made since the freeze time. That is, the delta value collapses all changes made since the freeze time into the delta value. When the changes are applied to a cube, every single change that occurred does not need to be applied. Rather, the delta value is used to apply the cumulative changes made since changes were last applied to the cube.

When all the changes have been applied for all blocks in the cube, then the new frozen values may be stored. In this case, a new freeze time is stored and the frozen values change to the new values that represent the changes made since the last freeze time. The delta values are also reset (i.e., nulled). The process then starts over as changes may be received again when delta values are changed.

Figure 1:
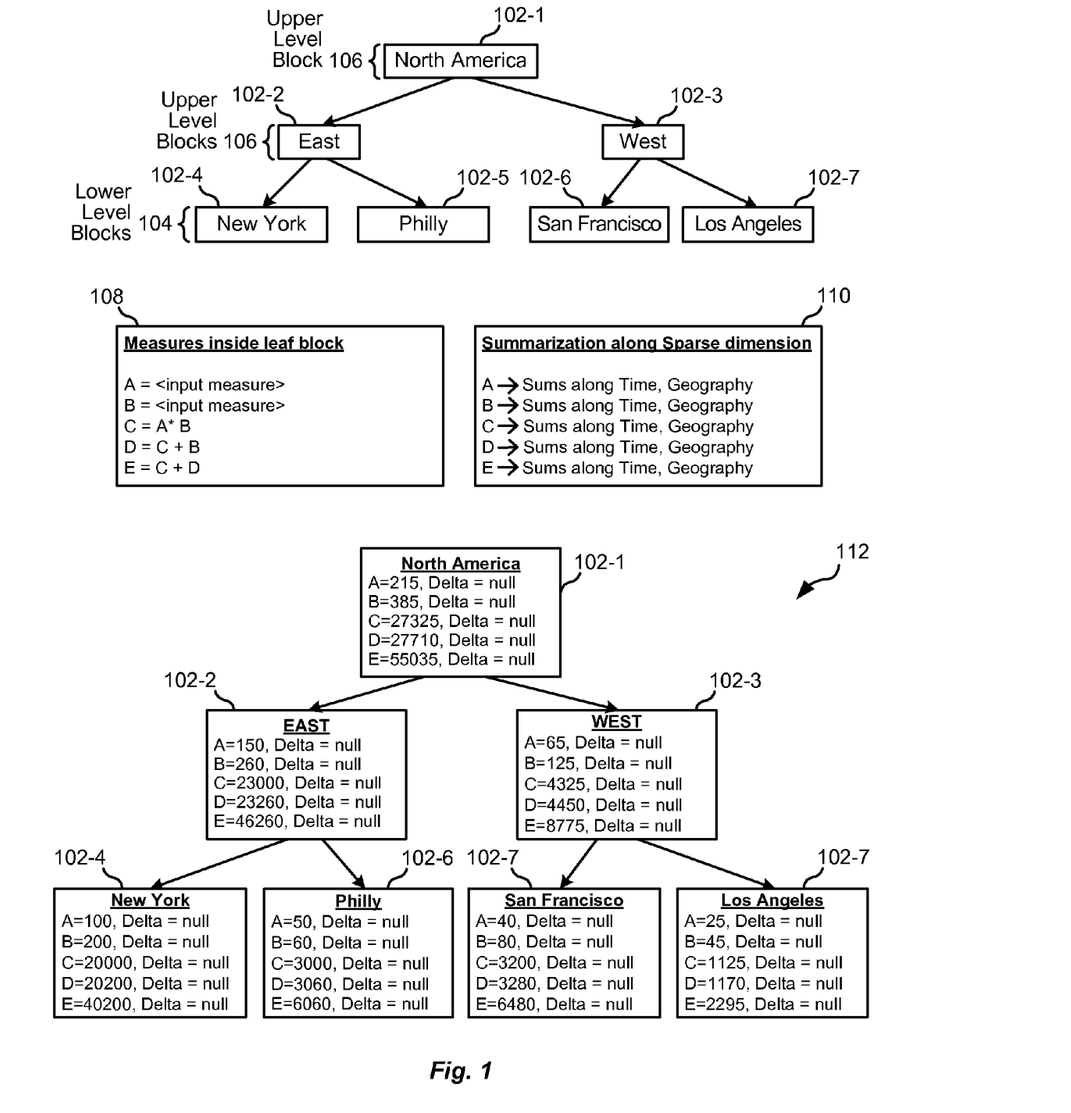
FIG. 1 shows a dataset according to one embodiment.

FIG. 1 shows a dataset according to one embodiment. The dataset is for a cube of data with a single sparse dimension (geography), a time dimension, and a measure dimension. A cube is a multi-dimensional dataset. Each data element in a cube is a dimensioned element. Dimensions, which may be sparsely or densely populated, define a number of indices that are used to refer to a data element. A number of measures may be numeric facts that are characterized by the dimensions.

A block of data may be a combination of two dimensions. FIG. 1 shows a plurality of blocks 102 according to one embodiment. Names are provided for the blocks identify the blocks. The blocks are arranged in a hierarchy. The hierarchy shows leaf blocks 104 that get calculated first and then the calculated values are summarized to upper level blocks 106. That is, the New York, Philly, San Francisco, and Los Angeles blocks 102-4-102-7 are the leaf blocks, and the upper level blocks are North America, East, and West blocks 102-1, 102-2, and 102-3. The hierarchy is also used to determine the impact of changes on different blocks. For example, if there is a change to the New York block 102-4, the change affects the East block 102-2 and the North America block 102-1, but not Philly block 102-5 or West block 102-3. Other calculations and relationships between blocks may also be appreciated and it will be understood the blocks shown are an example.

An example of calculations or formulas to apply in leaf blocks is shown in a box 108. This shows that a measure A is an input measure, which is a value that is input by the user. The measure B is also an input measure. The measures C, D, and E are calculated using various formulas. For example, a measure C is calculated by multiplying A and B together. Other formulae are provided for measures D and E. A summarization along a sparse dimension is shown in a box 110. The summarization shows which dimensions the measures depend on.

A hierarchy 112 shows various values for the measures in blocks 102. For New York block 102-4, the value for the measure A is 100 and the value for the measure B is 200. The measure C can be calculated by multiplying A*B (100*200), which results in 20,000. The value for D can then be calculated as C+B, which is 20,000+200=20,200. The value for measure E is C+D, which is 20,000+20,200=40,200. These values are shown in New York block 102-4. The values for other blocks may be calculated similarly.

In hierarchy 112, two values may be stored per measure per block. The first value is a frozen value for each measure. The frozen value is when the state of the system is where no changes are applicable to any blocks in the cube. The second value that is stored is a delta value. This is the difference between a new value and the frozen value. The new value is the value of the measure when a change is applied to the block and the measure values are recomputed. At any time, the frozen value and the delta value is stored for each measure. If the delta value is zero or null, then an additional value may not be stored for the delta value as a space optimization. As changes are applied to a measure, a frozen value remains the same but the delta value keeps changing and represents all the changes made since the time of freeze.

Particular embodiments eliminate the need to generate many derived entries that result from user entries. A user change may be a change when the user makes a change to a measure in a block. A derived change is a change to other measures that occur because of the user change. There may be many derived changes for a user change. As multiple user changes are made to a measure, the derived changes that result are collapsed into the delta value. For example, the derived changes to other measures in the block may be calculated and collapsed into a cumulative value of all changes made since the freeze time. The storage for delta values does not increase as multiple changes are received. Rather than storing each derived change that occurs for each user change, the delta value is stored and value changes. Conventionally, all the values that the delta value may have changed to as a result of multiple user changes were stored, which led to a large increase in data storage. Also, derived changes for other blocks may not be calculated until the other blocks are retrieved. This eliminates generation of multiple derived entries in other blocks if multiple user changes are being made. In another embodiment, derived changes to other blocks may be made even if the other blocks are not retrieved.

In one example, if a change generates 5 derived changes. This implies if user keeps making multiple changes—they keep experimenting for values of a measure from 3 to 5, 5 to 15.3, 15.3 to 17, etc. (trying to arrive at optimal number)—each such change generates 5 derived changes, which conventionally led to an explosion of derived entries that were generated and saved. However, by collapsing the changes into the delta value, no matter how many user changes are made, 5 derived changes are stored as the delta values. Conventionally, 100 changes may have led to 500 derived changes. Particular embodiments consolidate the delta values and the 100 changes still result in 5 changes (all 500 collapsed to 5) while the frozen value remains the same.

Figure 2:
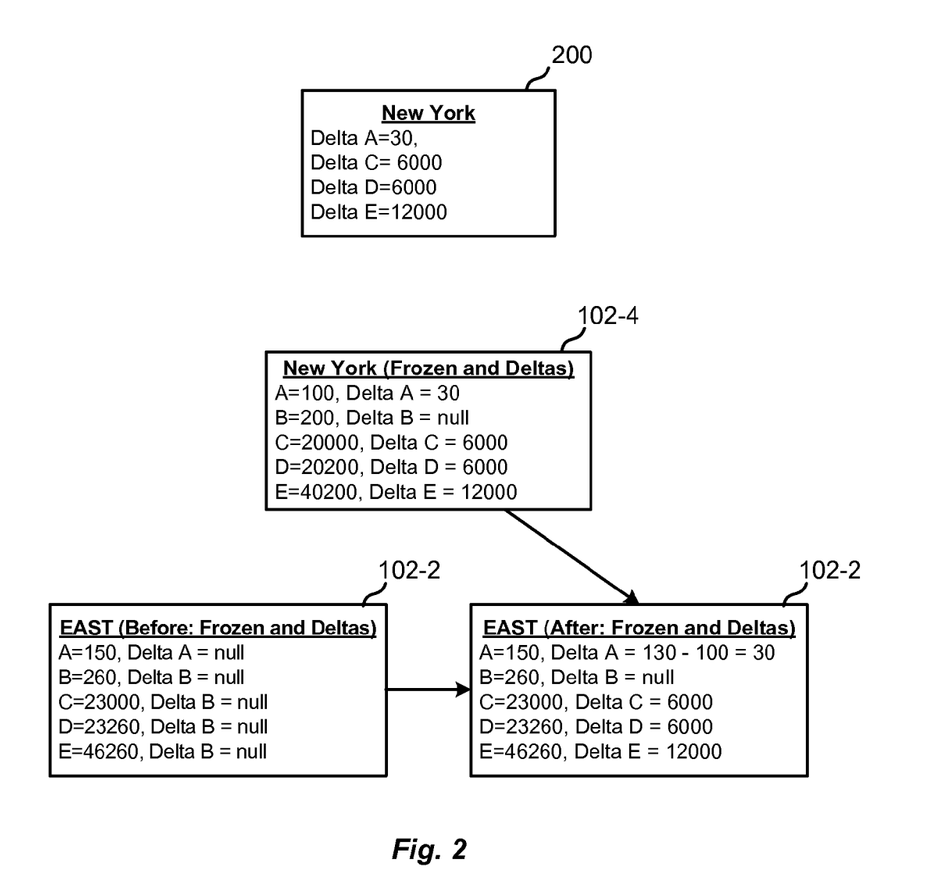
FIG. 2 shows an example of a change being applied according to one embodiment.

FIG. 2 shows an example of a change being applied according to one embodiment. A box 200 shows the deltas in New York block 102-4 after a change to measure A. The value of A has been changed from 100 to 130. This results in a delta of 30. The measures for C, D, and E are also changed based on the change to measure A. The frozen and delta values are then shown in New York block 102-4.

The changes may be applied to other blocks when the other blocks are retrieved. For example, as user changes occur to New York block 102-4, they are cumulated into delta values. The user changes may be propagated to other measures in the block. However, any derived changes are not calculated until a block is retrieved. The derived entries may be where the user changes affect measure values in other blocks. By cumulating the changes in a block and not applying each change to generate derived changes, fewer changes may be made.

From the hierarchy, when West block 102-3 is retrieved, the deltas for New York block 102-4 are not applicable to the West block because there is no dependency between the West block and the New York block. Thus, no changes may be made to the delta values of West block 102-3. However, when East block 102-2 is retrieved, the delta values for the New York block need to be recalculated. The values for the measures in East block 102-2 are recalculated by rolling the values up (e.g., summing them in this example) based on the new values in New York block 102-4.

East block 102-2 is shown with frozen values and deltas before the change is applied and after the change is applied.

When the East block is retrieved, a change log may indicate that a change has occurred in New York block 102-4. For example, a bit may be set in a bit set that indicates a change to a block has been made. Based on measure definitions and a dependency analysis, it is determined that the changes in New York block 102-4 should be rolled up to the East block 102-2. In one embodiment, all changes to measures may be rolled up. For example, the change log may indicate that a change has been made to the New York block 102-4. The log does not show which measures were changed, but this is not necessary because all delta values for measures are rolled up. In other embodiments, the measure that changed may only be rolled up. However, by not indicating which measures have been changed, logic may be simplified in that a roll up program for all measures is always performed.

The sum of the values from New York block 102-4 and Philly block 102-5 are rolled up. Before the delta value, the value of A was (New York+Philly)=100+50=150. The delta value is then applied to East block 102-2. For example, the delta from the New York block may be added to the East block for the respective measures. This is the simplest case and in other cases, the delta may be calculated by starting from the freeze time and determining the delta. This calculation would be the old value−the frozen value+new value=new value. For example, the new A=150−100+130=180. The values are summarized below:

$$A=100+50=150$$

$$\text{New } A=150-100+130=50+130=180.$$

$$\text{New Delta Value}=180-150=30.$$

In the above, for the New A calculation, 150 is the value of A before the change. 100 is subtracted from the value because it is the frozen value for New York block 102-4. 130 is the new value for New York block 102-4 and it is added. This equals 180. The new delta value for A is 180−150=30. Also, the delta values for B, C, D, and E can be calculated similarly. Although the delta value of 30 could be added instead of subtracting 100 and adding 130, different formulas that are applied to measures may require that the delta value is calculated from the freeze time.

Figure 3:
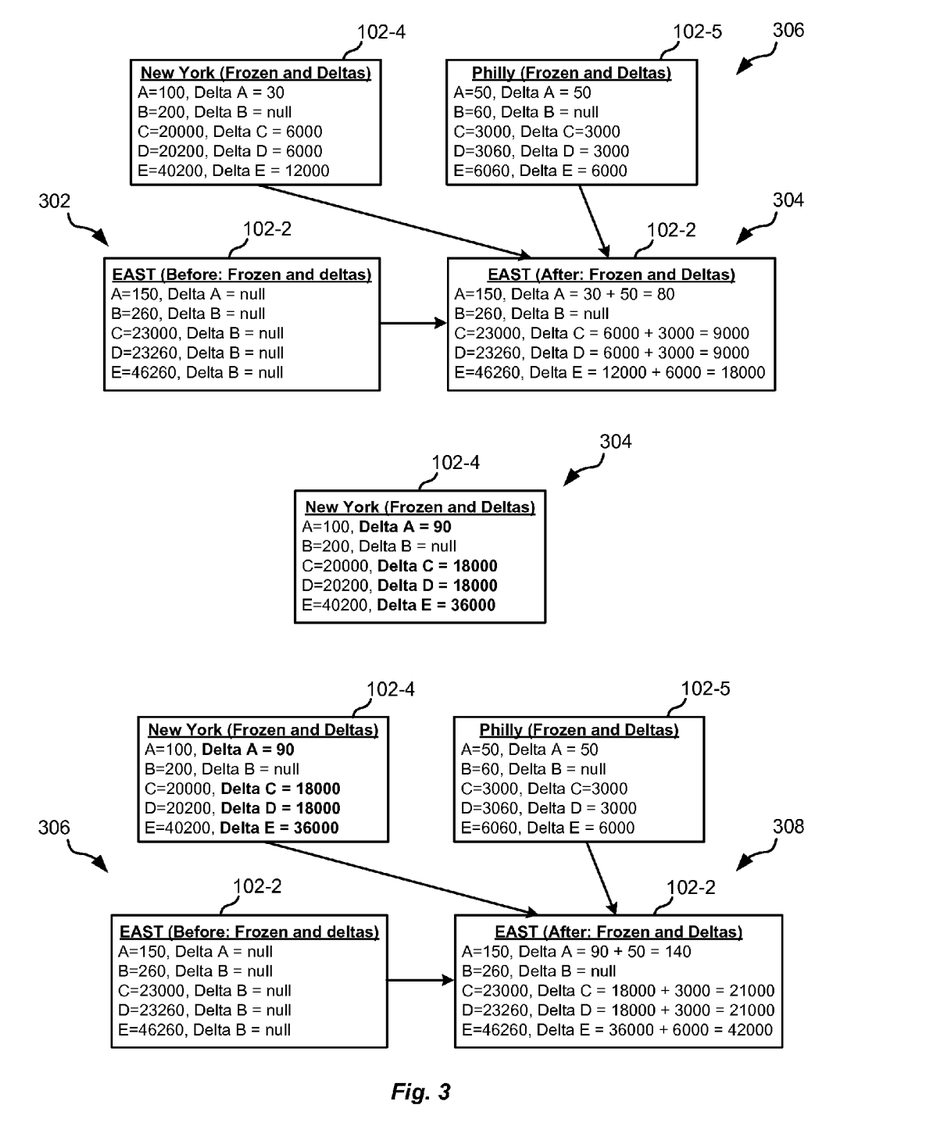
FIG. 3 depicts an example showing multiple changes that are applied according to one embodiment.

The delta value stored for each measure is cumulative. If multiple changes have been made to a measure, the delta value represents the value of the delta value if all changes were applied. FIG. 3 depicts an example showing multiple changes that are applied according to one embodiment. Two sets of changes are shown:

Change Set 1: New York block, measure *A* delta=30, Philly block, measure *A* delta=50.

Change Set 2: New York block, measure *A* delta=60.

The changes in change set 1 indicate that measure A has changed by 30 in the New York block and measure A has changed by 50 in a Philly block. That is, the new values for A is 150 in the New York block and 100 in the Philly block. For change set 2, the delta value is 60. This indicates that the value for measure A in the New York block is now 190.

The changes in change set 2 happen after the changes in change set 1. The values for the East block before the deltas have been applied are shown at 302. The values after the deltas are applied are shown in 304. In this case, the delta A is 30+50=80. The delta values for New York block 102-4 and Philly block 102-5 have been added for the New York block. The same is true for the other measures in the block.

After the changes in change set 2 are applied, the values in New York block 102-2 are shown at 306. As shown, the delta for A equals 90. Also, the new delta values for C, D, and E are shown. The delta value of 90 represents the cumulative delta value for measure A and the same holds true for delta values for C, D, and E. Because the delta values are cumulative, there may not be an easy way to know the deltas that were applied since the application of changes in change set 1. For example, box 306 shows the changes to East block 102-2 after applying change set 2. The changes that are applied are performed from the freeze time when the delta values are null. The new values are shown at 310. The values are used from the freeze time because the delta values are cumulative and there may not be a way to know what deltas were applied for the prior changes. For example, looking at East block 102-2, the delta is 80 after change set 1. However, it is not known how much of the delta came from the New York block first set of changes. Thus, it is not known how to apply the new delta of 90 in New York block 102-4 incrementally to East block 102-2. Accordingly, the deltas may be nulled in East block 102-2 and the deltas are applied again starting from the freeze time. That is, instead of taking the delta value of 80 for East and determining the new delta value for measure A, the delta for A in East is nulled and the new delta value for A of 90 is applied. As shown at 308, the delta value of 90+50=140 is determined for measure A. That is, the new delta value of 90 for New York is added to the delta value of 50 for Philly. The new deltas for New York with the Philly block are also added for measures C, D, and E.

The multiple changes to New York block 102-4 are combined and represented as a single change. This offsets the disadvantage of having to look at and apply all the changes to blocks since the freeze time. When the changes have been applied to the parent block (East block), the changes to the child blocks (New York and Philly blocks) can be removed, which provides further optimizations. The change in the East block represents all the changes from the New York and Philly blocks and thus changes in the New York and Philly blocks no longer need to be maintained once they are applied. For example, block level dependency is looked at but not for every change. This means, when a block is retrieved, the changes may be applied. For every change that occurs in a block, the changes may not be propagated to another block until that block is retrieved. This allows for multiple changes to be made to a block but does not result in an explosion of derived entries. Changes are also not applied if no new changes have been performed since the last application of changes.

A change may be represented efficiently as a bit vector representing the block indices. A bit vector may be a single bit that is changed to indicate that a change has occurred in a block. Methods other than a bit set may be used to indicate that a change has occurred. The bit vectors of blocks that have changed since the freeze point may be stored in a change log, which can be used to determine which blocks have been changed when a block has been retrieved.

When the changes to the parent block (East block) have been applied, then the change bit vector can be removed from the child blocks (New York and Philly blocks) and the change bit vector for the parent block is added. This reduces the number of changes to be applied. Because the changes have been applied to the parent, other changes do not need to be applied for the children if they summarize to one parent. If a child block summarizes to more than one parent, as in the case of multiple sparse dimensions, then the change bit vector may not be removed. The child blocks need to be kept as changed to apply the changes to the other parents.

The frozen values may be advanced when all changes have been applied for a cube. The determination that all changes have been applied for a cube may use a low watermark for the cube, a high watermark for the cube, and a high watermark for a block in the cube. These watermark values are used to keep track of the number of changes that are performed.

The low watermark for the cube corresponds to a sequence number in the change log. A low watermark implies that all blocks in the cube have applied the change entries up to and including the change entry corresponding to the low watermark. So, instead of starting from zero, the system can look at change entries starting from the low watermark of the cube.

The high watermark for the cube is a sequence number of the latest change entry for the cube. If the high watermark equals the low watermark, then there are no applicable changes and all blocks can be retrieved immediately without having to apply any changes. The high watermark is always greater than or equal to the low watermark.

The high watermark for a block in a cube indicates whether the sequence number of the latest change entry has been applied to a given block in the cube. If the high watermark of the cube is 100 and the low watermark of the cube is 76, then there are potentially 24 applicable change entries to any block in the cube.

Using the above system of storing frozen values and delta values, different situations may result when data is retrieved from the dataset. The following will describe different situations that use the frozen and delta values. It will be understood that other situations may be appreciated.

Figure 4:
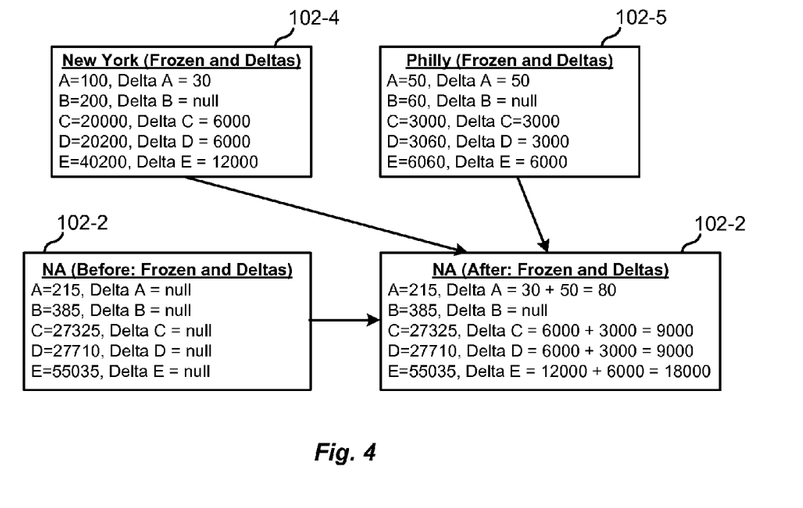
FIG. 4 shows an example when a non-immediate parent is retrieved according to one embodiment.

FIG. 4 shows an example when a non-immediate parent is retrieved according to one embodiment. If North America block 102-1 is retrieved immediately after changes to New York block 102-4 have been made and East block 102-2 has not yet been retrieved, changes have not been applied to East block 102-2. In this case, the deltas from New York block 102-4 and Philly block 102-5 can be applied to North America block 102-1 directly without having to apply changes to East block 102-2 first. This is because of the associative property of the aggregation. That is, because delta values are being used, the deltas for New York and Philly can be propagated up to North America without having to apply the deltas to the East block. However, a batch calculation may require that the East block may be first calculated. A batch calculation is where new frozen values are calculated for all blocks. In the batch calculation, one level of blocks are calculated at a time. Thus, a lower level is calculated before moving on to an upper level.

Changes can also be made to an upper level block. For example, if a user changes the East block before making changes to the New York block or Philly block, the change may be summarized to the North America block. If a user makes changes to the New York or Philly block at a later time, the changes may not propagate to the North America block until changes to the East block are balanced. This may be because it may not be desirable to make changes to the North America block multiple times.

In one example, if the delta value in East block 102-2 is 3000, as long as the sum of the changes in New York block 102-4 and Philly block 102-5 is less than 3000, then a balanced state is not current and none of the East changes propagate to North America block 102-1. Once the balancing state is reached, the block change for East block 102-2 may be removed as that change is represented by the changes in the leaf-level blocks New York block 102-4 and Philly block 102-5. As the balancing state is approached, the deltas in East block 102-2 may be offset with the changes being applied in the leaf-level blocks. For example, if the delta in East block 102-2 is 3000, and if a delta of 200 is made to New York block 102-4, then the delta in East block 102-2 is changed to 2800. Once the balanced state is reached, that is, the sum of the changes in New York block 102-4 and Philly block 102-5 equals the changes in East block 102-2, then the delta values may be propagated to North America block 102-1. This avoids making multiple changes to North America block 102-1 when the changes for lower level blocks may not be balanced.

Figure 5:
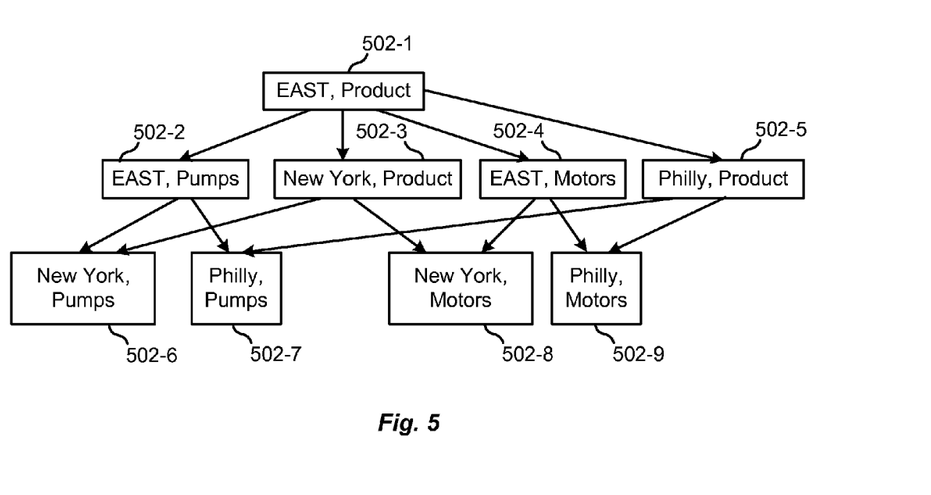
FIG. 5 shows an example of a hierarchy that shows multiple dimensions according to one embodiment.

Particular embodiments have been described with respect to a single dimension. However, it will be understood that particular embodiments may be used with multiple dimensions. FIG. 5 shows an example of a hierarchy that shows multiple dimensions according to one embodiment. In this example, two sparse dimensions are shown, geography and product. The aggregation path is to a root 502-1 with the geography dimension first and the product dimension second.

The delta values and frozen values are treated similar to the single dimension case. However, one difference is the measure-specific aggregation path. For example, a change to one measure in (New York, pumps) block 502-6 may first aggregate to (East, pumps) block 502-2 and then aggregate to (East, product) block 502-1. But another measure may first aggregate to (New York, product) block 502-3 and then aggregate to (East, product) block 502-1. In either case, the use of frozen values and delta values is applied in the same manner as the single dimension case.

The same may be true for other blocks. For example, (New York, motors) block 502-8 may be aggregated first to (New York, product) block 502-3 and then to (East, product) block 502-1. Another measure may aggregate first to (East, motors) block 502-4 and then to (East, product) block 502-1.

Particular embodiments may also apply to allocation. The above examples were described using aggregation; however, the allocation of values to blocks may also be used. In one embodiment, these different types of allocation may be used:
1. An input, loaded, or calculated measure at an upper level are calculated down to the children based on a percentage.
2. An input, loaded, or calculated measure at an upper level is copied down to the children and then used in further calculations. These measures do not aggregate back.
3. An input, loaded, or calculated measure at an upper level is copied down to the children and then used in further calculations. The calculated measures that use the allocated measures then aggregate back up to higher levels.
4. A measure at a lower level is aggregated up to the upper level and then allocated back down to the children to be used in a further calculation.
5. A measure at an upper level allocates along multiple dimensions—one dimension at a time—with the allocation path explicitly specified.

Figure 6A:
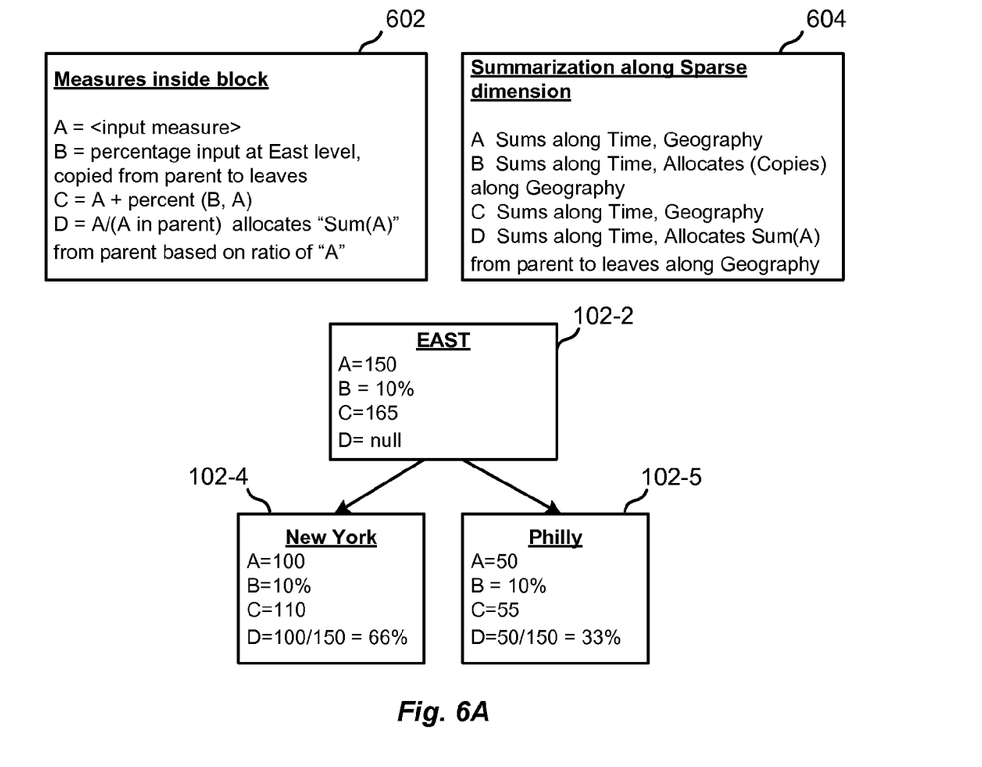
FIGS. 6A-6D show an example using allocation according to one embodiment.

FIG. 6A shows an example using allocation according to one embodiment. A box 602 shows the measures inside a block. The summarization along the sparse dimension is shown at 604. Also, values for East block 102-2, New York block 102-4, and Philly block 102-5 are shown.

Figure 6B:
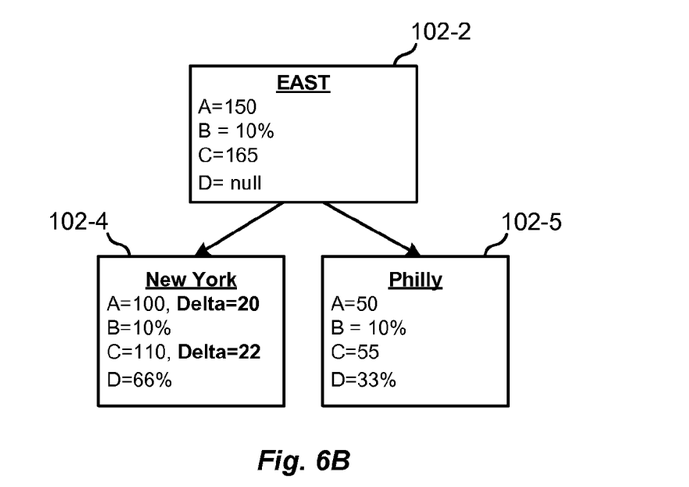

FIG. 6B shows how a change to a measure in a leaf block is applied in allocation according to one embodiment. The change to the measure A may cause the following steps to be performed:
a) change the frozen and delta values in New York block 102-4;
b) propagate the changes to East block 102-2 and calculate new delta values for measures A and C; and
c) propagate the changes from East block 102-2 back to New York block 102-4 and Philly block 102-5 causing new deltas to be computed for measure B.

Figure 6C:
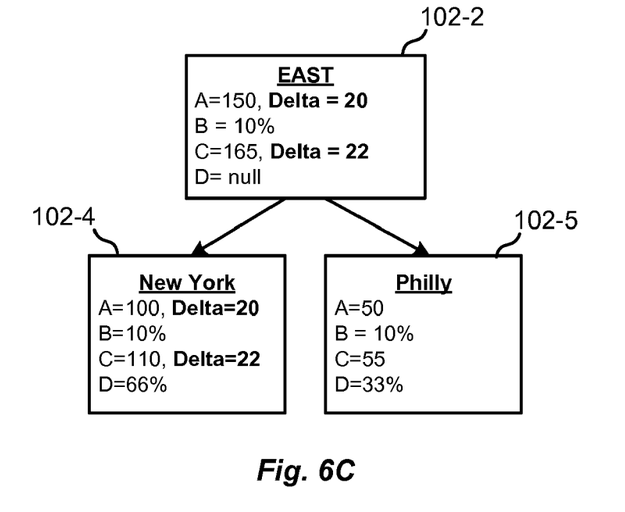

When East block 102-2 is retrieved, the changes in New York block 102-4 need to be applied. FIG. 6C shows changes applied to East block 102-2 according to one embodiment. In this case, the delta values of 20 and 22 have been applied to measures A and C.

Figure 6D:
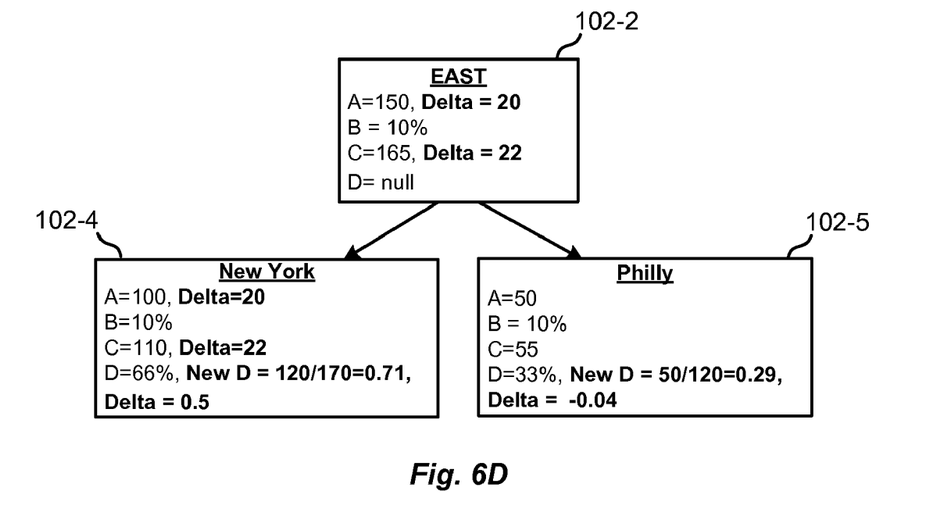

After applying the deltas to East block 102-2, these deltas need to be applied to New York block 102-4 and Philly block 102-5. FIG. 6D shows the changes that are applied to New York block 102-4 and Philly block 102-5.

After the changes shown in FIG. 6B, New York block 102-4 does not reflect the correct value for the measure D. The values for East block 102-2 need to be calculated and new changes generated. The new changes then force a recalculation of New York block 102-4 again. These changes are propagated back into New York block 102-4 and Philly block 102-5.

Figure 7A:
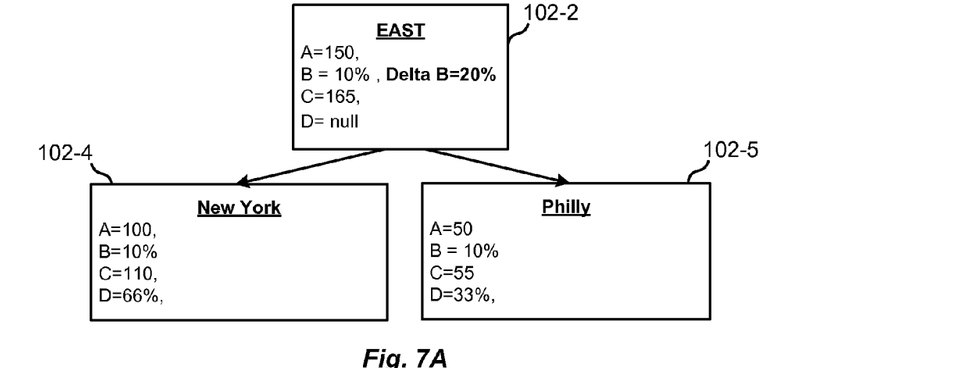
FIGS. 7A-7C show a change to a percentage value of a measure according to one embodiment.

FIG. 7A shows a change to a percentage value of a measure according to one embodiment. The percentage in a measure B in East block 102-2 may be changed. The percentage needs to be propagated to leaf level blocks New York block 102-4 and Philly block 102-5. As shown, the delta B value is 20%. Thus, the percentage of B in East block 102-2 has been changed from 10% to 30% for a delta of 20%. This value needs to be propagated to New York block 102-4 and Philly block 102-5, and then the new deltas for measure C need to be calculated.

Figure 7B:
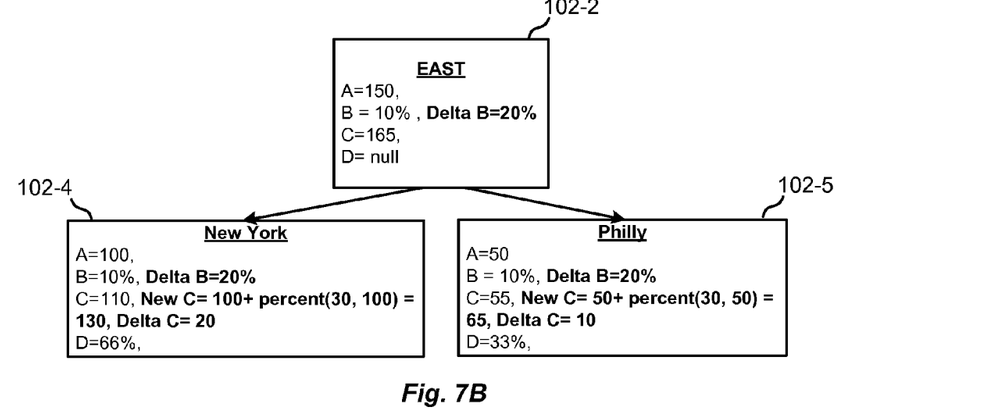

FIG. 7B shows changes to New York block 102-4 and Philly block 102-5 in the percentage calculation according to one embodiment. When New York block 102-4 and Philly block 102-5 are retrieved, the delta B value is propagated into those blocks. This results in a delta B value of 20% and a delta C value of 20 for New York block 102-4 and a delta B value of 20% and a delta C value of 10 for Philly block 102-5.

Figure 7C:
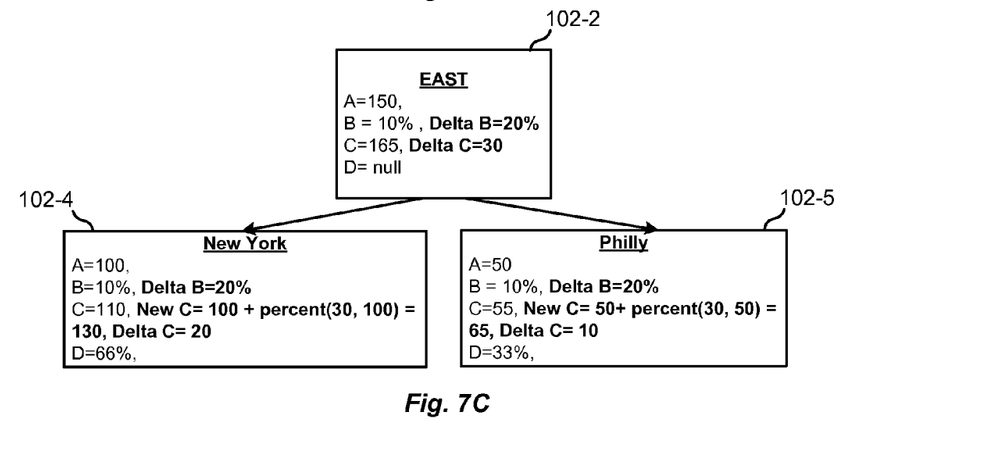

When East block 102-2 is retrieved again, the changes to measure C in New York block 102-4 and Philly block 102-5 are propagated and new values for measure C are computed. FIG. 7C shows the changes to measure C in East block 102-2 according to one embodiment. As shown, the value of delta value C is 30. Accordingly, allocation has been handled using delta values where delta values are propagated between different blocks.

Other situations may also be dealt with using particular embodiments. Row source change entries are changes that are already stored as complete values as opposed to delta values. These values may be kept in a separate list and the changes are applied along with the changes to the blocks.

When scenarios are submitted, the blocks are copied in the scenario to a base sandbox and overwritten when there is a clash. Also, the row source change list is copied as well as the change bits to the sandbox. The watermarks are also updated in the base sandbox with those of the sandbox of the scenario being submitted.

A report of user changes may be provided. Because multiple user changes are combined in a block and a change list is not explicitly maintained, the change entries may be stored in a table. The table may be used only for reporting purposes. For example, when a list of scenarios, comments, etc. are needed, the table is used.

A touch list may also use particular embodiments. The following rules for a touch list may be applied:

An aggregation may generate a new change entry if the deltas generated by the aggregation impact on changed measures, which in turn cause further roll down to other blocks.

If a user change leads to a generation of new derived entries in another block or the same block, not all the calculations may happen in the same transaction. Since a transitive closure may involve a significant number of blocks, those blocks may be added to a touch list but the change list is not completely emptied.

When new blocks are retrieved and changes are applied, the touch list is checked to see if it is not empty. In this case, the sandbox is provided with a stronger lock-mode required to generate new change entries.

Figure 8:
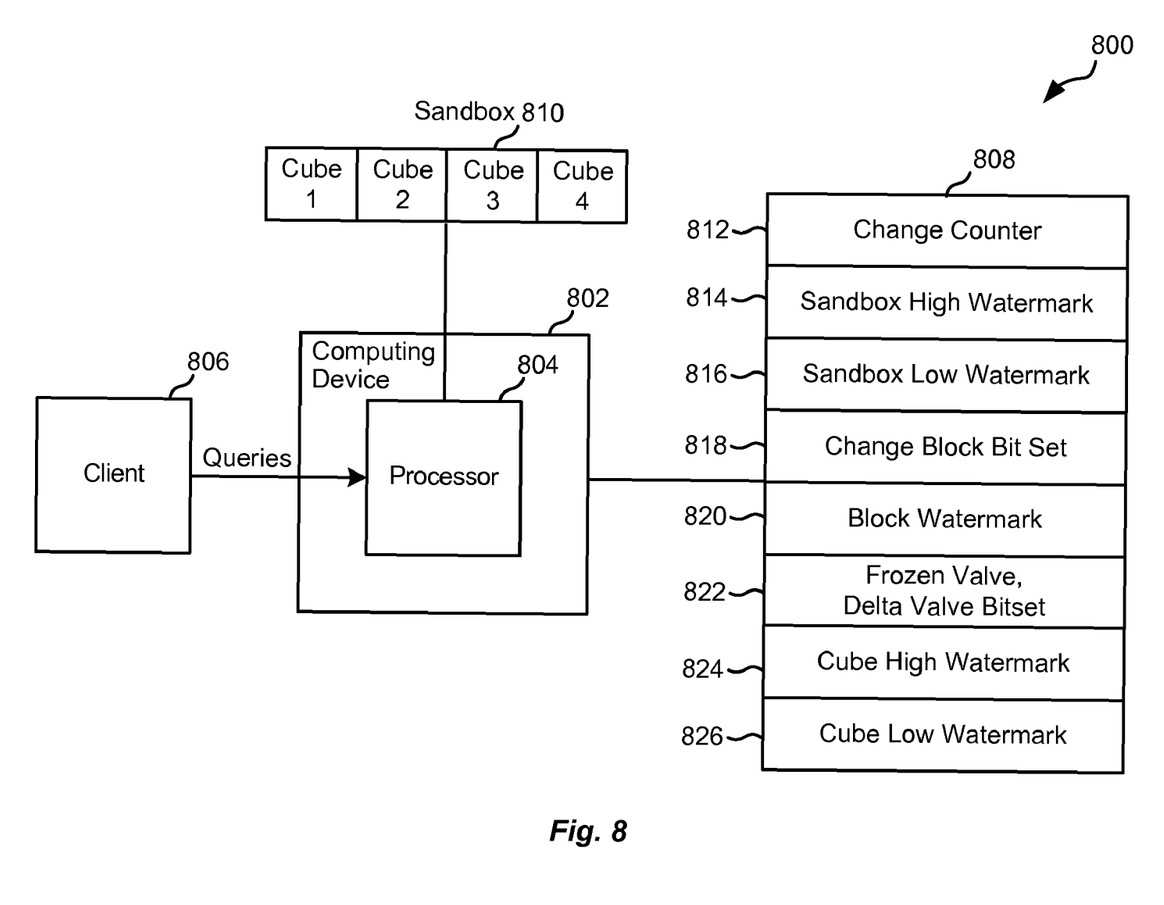
FIG. 8 depicts data structures in a system according to one embodiment.

FIG. 8 depicts data structures in a system 800 according to one embodiment. A computing device 802 includes a computer processor 804. Processor 804 may process queries from client 806. The queries may be for manipulating data stored in sandbox 810. For example, certain what-if scenarios may be performed by a user using an OLAP data application.

Sandboxes 810 may be user-created areas that include multiple cubes of data, such as cubes 1-4. Other sandboxes may also be appreciated.

A data structure 808 is provided that includes different data that is used in particular embodiments. Although data structure 808 is shown as a single data structure, it will be understood that the data may be stored in different areas.

A change counter 812 is a counter that is incremented every time a user makes a change in sandbox 810. Change counter keeps track of the number of changes made. In one embodiment, the counter starts from −1 (no change) and the first change increments the counter to 0. The counter grows sequentially from there. Change counter 812 may be stored with sandbox 810 and is different for different sandboxes.

A sandbox high watermark 814 is a current value of change counter 812. The high watermark is maintained for sandbox 810 and for other sandboxes. Also, a cube high watermark 824 includes a counter for each individual cube. If there are four cubes, and the current sandbox high-water mark value is 100, and a new change happens in a block that belongs to cube 3, then the value for change counter 812 and sandbox high watermark 814 is incremented to 101. Also, cube high watermark 824 for cube 3 is also incremented. The cube high watermark values for the three other cubes remain the same.

A sandbox low watermark 816 is a change counter value of a sandbox at the completion of a batch calculation, i.e., after a freeze time in which all applicable changes are applied to the sandbox. At the end of the batch calculation, sandbox high watermark 814 is equal to sandbox low watermark 816. This implies that all blocks in the sandbox are current with respect to any applicable changes, have been completely recalculated, and have new frozen values. A cube watermark 826 is also maintained for all the cubes. The cube low watermark value only changes after a batch calculation.

A change bit block set 818 is a bit set of a list of blocks that contain user changes and also provides measure changes that need to be propagated to other blocks. This is a bit set where the index of a block into the bits is computed, such as by using a member identifier, the number of members in each dimension, and ordering the different dimension. Thus, each block may be associated with a bit in the block bit set. The bit for a block is set when a change is applicable to that block.

A reset of change block bit set 818 occurs when the low watermark of a sandbox is equal to its high watermark. The bit set is cleared because all the blocks are current and fully recalculated and there is no need to apply any more changes.

A block watermark 820 maintains a value for the status of a block. When a change is made to a block, the value of block watermark 820 is incremented. If a block belongs to, for example cube 2, and the high and low watermark values of cube 2 in the current sandbox are equal, then the block is current and the block watermark of the cube is then equal to the high watermark of the cube. If the block watermark is less than the high watermark of the cube, then changes need to be applied. When the change block bit set is reviewed and all changes are applied, the block watermark is then equal to the high watermark of the sandbox.

As mentioned above, the indices of changed blocks are stored in change block bit set 818. The bit set does not maintain the blocks in the order in which they were changed. However, because all changes need to be applied, the order is not needed. Also, because multiple changes for a measure inside the block have been collapsed using the cumulative delta value, the order of traversal may be the order of bit set indices rather than the order in which the blocks were changed. This is an optimization and simplification from having to maintain the order and also perform each individual change explicitly.

When a block needs to be updated with changes from another block, a dependency analysis may be performed. Given a block, B1, that needs to be updated with changes from another block, B2, from the change block bit set 818, processor 804 determines how to apply the changes. If B1 is a parent or ancestor of B2, then processor 804 looks at all the measures in B2 that have non-zero deltas and also have a bit that is set indicating a roll up should be performed. A rollup program is then applied to roll the delta values up to B1. If B1 is a child or descendant of B2, then all the measures in B2 are reviewed that have non-zero deltas and also a roll down operator set. A roll down program is then performed to roll the delta values down to B2.

In a change bit block set collapse, if a block B1 aggregates from blocks, such as B2 and B3, in the bit set, aggregation is performed first. If block B1 is the only parent of blocks B2 and B3 in change block bit set 818, and blocks B2 and B3 do not have any roll down measures set, then at the end of the change application, blocks B2 and B3 may be removed from the bit set. Thus, a bit is not set that a change has occurred in B2 and B3. In their place, a bit for block B1 is set. The changes in B1 now completely represent all the changes represented by blocks B2 and B3.

For each block, the frozen values and delta values are stored. The block stores m measures and n time members, then m×n array of doubles are allocated to store the frozen values. Also, a bit set of size m to indicate which measures have non-zero deltas is created. Two additional storages, one bit set indicating the indices of non-zero delta locations and another compact array of doubles storing the delta values themselves is used.

Accordingly, an efficient change application using frozen values and delta values is provided. The change application uses user entries to drive the changes. An explosion of derived entries is avoided because delta values are cumulative over many changes. When a block is retrieved, any changes according to the delta values are applied at that time. This avoids an explosion of derived entries.

The following is psuedocode that describes particular embodiments.

Change Application Function:

```
ApplyChanges (Block B)
{
      Sandbox sb = getCurrentSandbox( );
   Cube cube = B.getCube( );
   If (sb.getLowWaterMark(cube) == sb.getHighWaterMark(cube)) {
                              B.setWaterMark(sb.getLowWaterMark(cube));
                    Return; // all blocks are current
   }
      If (B.getWaterMark( ) >= sb.getHighWaterMark(cube)) {
                 B.setWaterMark(sb.getHighWaterMark(cube));
                 Return; // current block requires no changes
            }
      // before particular embodiments apply changes particular embodiments need
to clear out the deltas in the
      // block. Particular embodiments apply ALL the changes from freeze time,
each time.
       B.clearOutDeltas( );
      // now apply changes
       BitSet bitSet = sb.getChangedBlockBitSet( );
         BitSet newBitSet = bitSet.clone( );
         Boolean Modified = false;
         For (Block BC : bitset) {
                              If ((ancestor (B, BC)) && (BC.hasRollupMeasures( ))) {
                                 Modified |= rollupDeltas(BC, B);
                                 if ((parent(BC) == B) && (parentCount(BC) == 1)) {
                                    newBitSet.clear(BC);
                                    newBitSet.add(B);
                                 }
                 }
                 Else If ((crossCubeDependent(B, BC)) &&
                              (BC.hasCrosscubeMeasures( ))) {
                       Modified |= rollupDeltas(BC, B);
                       }
                              Else If ((descendant(B, BC)) &&
                                 (BC.hasRolldownMeasures( ))) {
                    Modified |= rolldownDeltas(BC, B);
                              }
      }
      RowSourceChangeList cl = sb.getRowSourceChangeList( );
      For (ChangeEntry ce: cl) {
         If (rollsupToBlock(ce, B)) {
                    Modified |= rollup(ce,B);
         }
      }
}
```

Change Application Function:

```
If (Modified) {
        // calculates all other measures in the block using
        // dense calculations
                Calculate(B);
    }
    Sb.setChangedBlockBitSet(newBitSet);
}
```

Rollup Deltas Function:

```
// child is the block with deltas and parent is the block being
// updated and brought up to "current change".
rollupDeltas (Block child, Block parent)
{
    BitSet changedMeasures = child.getMeasuresWithNonZeroDeltas( );
    For (Measure m : changedMeasures) {
      // sparse rollups may start from upper level sometimes. So,
      // pass the two blocks to figure out whether there is a rollup
      // between the levels represented by the two blocks.
           If (m.hasSparseRollups(child, parent)) {
           rollupDeltas(child, parent, m);
        }
        Else If (m.hasCrossCubeRollups(child, parent)) {
           rollupCrossCubeDeltas(child, parent, m);
        }
    }
}
// rollup function for a specific measure
rollupDeltas (Block child, Block parent, Measure m)
{
    // get an expanded array of values representing other
    // dense dimensions - typically time i.e., values for all
    // time members. Remember particular embodiments initially cleared the
deltas for
    // parent.
        // It turns out particular embodiments don't need frozen values from
child and parent
    // most of the time. Sometimes for complex functions, particular
embodiments
    // pass them.
    Double[ ] frozenValues        = child.getExpandedFrozenValues(m);
    Double[ ] parentFrozenValues  = parent.getExpandedFrozenValues(m);
    Double[ ] deltas              = child.getExpandedDeltas(m);
    Location[ ] parentLocations   = parent.getLocations(m);
        Double[ ] parentDeltas        = parent.getExpandedDeltas(m);
    For (int i=0; i < parentLocations.length; i++) {
        If (m.needsFrozenValuesForRollup( )) {
            Double newDelta = m.computeNewDelta(
               parentFrozenValues[i],
               parentDeltas[i],
               frozenValues[i],
               deltas[i]);
            parentLocations[i].storeDelta(newDelta);
        } else {
            parentLocations[i].storeDelta(
               parentDelta[i] + deltas[i]);
        }
    }
}
```

Rolldown Deltas Function:

```
// parent is the block with deltas and child is the block being
// updated and brought up to "current change".
rolldownDeltas (Block parent, Block child)
{
    BitSet changedMeasures = parent.getMeasuresWithNonZeroDeltas( );
    For (Measure m : changedMeasures) {
      // sparse rolldowns may start from upper level sometimes. So,
      // pass the two blocks to figure out whether there is
      // a rolldown between the levels represented by the
      // two blocks.
           If (m.hasSparseRolldowns(parent, child)) {
           rolldownDeltas(parent, child, m);
        }
    }
}
// rolldown function for a specific measure
rolldownDeltas (Block parent, Block child, Measure m)
{
    // get an expanded array of values representing other
    // dense dimensions - typically time i.e., values for all
    // time members. Remember particular embodiments initially cleared the
deltas for
    // child, which is being updated.
        // Particular embodiments sometimes do not need frozen values from
child and parent
    // most of the time. Sometimes for complex functions, particular
embodiments
    // pass them.
    Double[ ] frozenValues      = parent.getExpandedFrozenValues(m);
    Double[ ] childFrozenValues = child.getExpandedFrozenValues(m);
    Double[ ] deltas            = parent.getExpandedDeltas(m);
    Location[ ] childLocations  = child.getLocations(m);
        Double[ ] childDeltas       = child.getExpandedDeltas(m);
    For (int i=0; i < childLocations.length; i++) {
        If (m.needsFrozenValuesForRolldown( )) {
            Double newDelta = m.computeNewDelta(
               childFrozenValues[i],
               childDeltas[i],
               frozenValues[i],
               deltas[i]);
            childLocations[i].storeDelta(newDelta);
        } else {
            childLocations[i].storeDelta(
               childDeltas[i] + deltas[i]);
        }
    }
}
```

Adjustment of Deltas Function When Upper Level Change is Made:

```
// When particular embodiments have a block with changes, particular
embodiments check whether particular embodiments need to
// compensate the deltas.
adjustDeltas (Block newBlockWithChanges)
{
     Sandbox   sb = getCurrentSandbox( );
    BitSet bitSet = sb.getChangedBlockBitSet( );
    For (Block BC : bitset) {
            If ((ancestor (newBlockWithChanges, BC)) &&
           (BC.hasRollupMeasures( )) &&
           (updatesToMeasuresClash(newBlockWithChanges, BC))) {
           // The new block is ancestor of some changed block
           // in the bit set and their changes "clash". Now
           // particular embodiments need to adjust deltas in
"newBlockWithChanges"
```

Adjustment of Deltas Function When Upper Level Change is Made:

```
            // with the deltas in BC
            compensateDeltas(newBlockWithChanges, BC);
        } else If ((ancestor(BC, newBlockWithChanges)) &&
            (newBlockWithChanges.hasRollupMeasures( )) &&
            (updatesToMeasuresClash(BC, newBlockWithChanges))) {
            // The new block is descendant of some changed block
            // in the bit set and their changes "clash". Now
            // particular embodiments need to adjust deltas in THAT block
"BC"
            // with the deltas in "newBlockWithChanges"
            compensateDeltas(BC, newBlockWithChanges);
        }
    }
}
```

Calculation of a Block And Add Dependent Blocks To Touch List:

```
// After all the rollup and rolldowns based on the changed block
// bitset are done, particular embodiments now have the "inputs" for the
block. In this
// function, particular embodiments calculate all the other measures that
depend on
// these input measures. Also particular embodiments add other
// dependent blocks that need to be calculated because of new changes
// in this block to the touch list.
calculate (Block changedBlock)
{
        Cube cube = changedBlock.getCube( );
        Sandbox sb = getCurrentSandbox( );
        // following is a standard function that
        // computes the values of all measures in the form of frozen
        // value and deltas.
        calculateAllMeasures(changedBlock);
        // Now, particular embodiments need to see the impact of this
changedBlock and its
        // measures on other blocks. Particular embodiments look at the
metadata as well as
        // deltas to see whether new blocks need to be updated. If the
        // metadata says there is an onChange rolldown measure that causes
        // change propagation to other blocks, then particular embodiments look
at whether
        // that measure has non-zero deltas. In that case, particular embodi-
ments
have a
        // rolldown impact and this changedBlock must be added to bitset.
        // Particular embodiments also look at impact through transitive closure
        // i.e., if measure m1 rolls up and m1 at upper level
        // is used in calculating measure m2, and suppose m2 is onChange
        // rolldown measure, then particular embodiments have an indirect impact.
        Boolean rolldownImpact = cube.hasRolldownImpact(changedBlock);
        If (rolldownImpact) {
            sb.markBlockForChange(changedBlock);
            BitSet impactedBlocks = cube.rolldownImpactBlocks(
                changedBlock);
            sb.getTouchList( ).add(impactedBlocks);
        }
        // Particular embodiments do a similar rollup impact using transitive
closure. The
        // impact implies that the existing changes that caused the
        // changedBlock to change cannot be used, and particular embodiments
need new changes.
        // This can happen if a new measure starts rolling up from the
        // level represented by the changedBlock i.e., startLevel for
        // rollup equal to the level of the changedBlock.So, there is a
        // new rollup from this block. Also, particular embodiments can have
transitiveCLE
        // set to true which implies new changes at this level must be
        // used for rolling up to parents.
        Boolean rollupImpact = cube.hasRollupImpact(changedBlock);
        If (rollupImpact) {
            sb.markBlockForChange(changedBlock);
            BitSet impactedBlocks = cube.rollupImpactBlocks(
                changedBlock);
```

Calculation of a Block And Add Dependent Blocks To Touch List:

```
            sb.getTouchList( ).add(impactedBlocks);
        }
        // Particular embodiments do a similar crosscube impact using transitive
closure
        Boolean crosscubeImpact = cube.hasCrossCubeImpact
(changedBlock);
        If (crosscubeImpact) {
            sb.markBlockForChange(changedBlock);
            BitSet impactedBlocks = cube.crosscubeImpactBlocks(
                changedBlock);
            sb.getTouchList( ).add(impactedBlocks);
        }
        // Particular embodiments do a similar impact analysis using transitive
closure for
        // constraint calculation. Particular embodiments calculate blocks lazily
but if
        // constraints are defined at "Summary" levels and changes are
        // done at leaf level, then particular embodiments need to force the blocks
where
        // constraints are defined to be added to touchlist.
        Boolean constraintImpact = cube.hasConstraintImpact
(changedBlock);
        If (constraintImpact ) {
            sb.markBlockForChange(changedBlock);
            BitSet impactedBlocks = cube.constraintImpact Blocks(
                changedBlock);
            sb.getTouchList( ).add(impactedBlocks);
        }
}
```

Although the description has been described with respect to particular embodiments thereof, these particular embodiments are merely illustrative, and not restrictive. Although a cube of data is described, it will be understood that other datasets may be used.

Any suitable programming language can be used to implement the routines of particular embodiments including C, C++, Java, assembly language, etc. Different programming techniques can be employed such as procedural or object oriented. The routines can execute on a single processing device or multiple processors. Although the steps, operations, or computations may be presented in a specific order, this order may be changed in different particular embodiments. In some particular embodiments, multiple steps shown as sequential in this specification can be performed at the same time.

Particular embodiments may be implemented in a computer-readable storage medium for use by or in connection with the instruction execution system, apparatus, system, or device. Particular embodiments can be implemented in the form of control logic in software or hardware or a combination of both. The control logic, when executed by one or more processors, may be operable to perform that which is described in particular embodiments.

Particular embodiments may be implemented by using a programmed general purpose digital computer, by using application specific integrated circuits, programmable logic devices, field programmable gate arrays, optical, chemical, biological, quantum or nanoengineered systems, components and mechanisms may be used. In general, the functions of particular embodiments can be achieved by any means as is known in the art. Distributed, networked systems, components, and/or circuits can be used. Communication, or transfer, of data may be wired, wireless, or by any other means.

It will also be appreciated that one or more of the elements depicted in the drawings/figures can also be implemented in a more separated or integrated manner, or even removed or rendered as inoperable in certain cases, as is useful in accordance with a particular application. It is also within the spirit and scope to implement a program or code that can be stored in a machine-readable medium to permit a computer to perform any of the methods described above.

As used in the description herein and throughout the claims that follow, "a", "an", and "the" includes plural references unless the context clearly dictates otherwise. Also, as used in the description herein and throughout the claims that follow, the meaning of "in" includes "in" and "on" unless the context clearly dictates otherwise.

Thus, while particular embodiments have been described herein, latitudes of modification, various changes, and substitutions are intended in the foregoing disclosures, and it will be appreciated that in some instances some features of particular embodiments will be employed without a corresponding use of other features without departing from the scope and spirit as set forth. Therefore, many modifications may be made to adapt a particular situation or material to the essential scope and spirit.

I claim:

1. A method for storing block data for a cube of data, the cube of data including a plurality of blocks of data, the method comprising:
    storing a first value for a measure in a block of data for the cube of data, the first value being a value at a freeze time in which all applicable changes have been made to the block of data;
    storing a second value for the measure in the block of data for the cube of data, wherein the second value collapses changes made to the measure since the freeze time in the second value;
    receiving a value change to the measure;
    calculating, by a computer processor, a new second value based on the value change; and
    storing the new second value in place of the second value previously stored for the measure, the new second value including information describing a difference between the first value and the value change.

2. The method of claim 1, wherein the change comprises a user change, wherein any derived changes to a second block caused by the user change are not applied until the second block is retrieved.

3. The method of claim 1, wherein calculating comprises cumulating the change and any changes before the change since the freeze time as the new second value.

4. The method of claim 3, wherein a record of what values were changed in the any changes is not stored.

5. The method of claim 1, further comprising:
    determining that a second block is to be retrieved;
    determining if the change is applicable to the second block; and
    applying the change to a second value for a second measure in the second block using the second value for the block.

6. The method of claim 5, wherein the change is not applied until the second block is received, wherein one or more changes occurred before the change and the one or more changes were not applied to the second block.

7. The method of claim 5, wherein applying the change comprises determining a new second value for the second measure, wherein the new second value for the second measure collapses changes made to the second measure since the freeze time.

8. The method of claim 1, further comprising:
    determining when all applicable changes have been applied to the cube of data;
    setting the first value to a new first value for the block of data;
    setting a new freeze time in response to setting the new first value; and
    nulling the second value.

9. The method of claim 1, wherein a bit is set to indicate the change has occurred in the block.

10. The method of claim 9, wherein an order of changes made to different blocks of data in the cube of data is not stored in the bit set.

11. A computer-readable storage medium comprising encoded logic for execution by the one or more computer processors, the logic when executed instructing the one or more computer processors to perform:
    storing a first value for a measure in a block of data for the cube of data, the first value being a value at a freeze time in which all applicable changes have been made to the block of data;
    storing a second value for the measure in the block of data for the cube of data, wherein the second value collapses changes made to the measure since the freeze time in the second value;
    receiving a value change to the measure;
    calculating, by a computer processor, a new second value based on the value change; and
    storing the new second value in place of the second value previously stored for the measure, the new second value including information describing a difference between the first value and the new second value.

12. The computer-readable storage medium of claim 11, wherein the change comprises a user change, wherein any derived changes to a second block caused by the user change are not applied until the second block is retrieved.

13. The computer-readable storage medium of claim 11, further comprising:
    determining that a second block is to be retrieved;
    determining if the change is applicable to the second block; and
    applying the change to a second value for a second measure in the second block using the second value for the block.

14. The computer-readable storage medium of claim 13, wherein the change is not applied until the second block is received, wherein one or more changes occurred before the change and the one or more changes were not applied to the second block.

15. The computer-readable storage medium of claim 13, wherein applying the change comprises determining a new second value for the second measure, wherein the new second value for the second measure collapses changes made to the second measure since the freeze time.

16. The computer-readable storage medium of claim 11, further comprising:
    determining when all applicable changes have been applied to the cube of data;
    setting the first value to a new first value for the block of data;
    setting a new freeze time in response to setting the new first value; and
    nulling the second value.

17. The computer-readable storage medium of claim 11, wherein a bit is set to indicate the change has occurred in the block.

18. The computer-readable storage medium of claim 11, wherein the change comprises a user change, wherein any derived changes to a second block caused by the user change are not applied until the second block is retrieved.

19. The method of claim 18, wherein an order of changes made to different blocks of data in the cube of data is not stored in the bit set.

20. An apparatus comprising:
one or more computer processors; and
logic encoded in one or more computer readable storage media for execution by the one or more processors, the logic when executed instructing the one or more computer processors to perform:
storing a first value for a measure in a block of data for the cube of data, the first value being a value at a freeze time in which all applicable changes have been made to the block of data;
storing a second value for the measure in the block of data for the cube of data, wherein the second value collapses changes made to the measure since the freeze time in the second value;
receiving a value change to the measure;
calculating, by a computer processor, a new second value based on the value change; and
storing the new second value in place of the second value previously stored for the measure, the new second value including information describing a difference between the first value and the new second value.

* * * * *

UNITED STATES PATENT AND TRADEMARK OFFICE
CERTIFICATE OF CORRECTION

| | | |
|---|---|---|
| PATENT NO. | : 8,271,426 B2 | Page 1 of 1 |
| APPLICATION NO. | : 12/572048 | |
| DATED | : September 18, 2012 | |
| INVENTOR(S) | : Ramaiyer | |

It is certified that error appears in the above-identified patent and that said Letters Patent is hereby corrected as shown below:

On sheet 8 of 8, in figure 8, Reference Numeral 822, line 1, delete "Valve," and insert -- Value, --, therefor.

On sheet 8 of 8, in figure 8, Reference Numeral 822, line 2, delete "Valve" and insert -- Value --, therefor.

In column 12, line 25, delete "psuedocode" and insert -- pseudocode --, therefor.

In column 13, line 53, delete "parentDelta[i]" and insert -- parentDeltas[i] --, therefor.

In column 14, line 24, delete "}" and insert -- { --, therefor.

Signed and Sealed this
Eighteenth Day of December, 2012

David J. Kappos
*Director of the United States Patent and Trademark Office*